United States Patent
Hickey et al.

(10) Patent No.: US 9,403,460 B2
(45) Date of Patent: Aug. 2, 2016

(54) VEHICLE SEATING ASSEMBLY HAVING A CLIMATE CONTROLLED SEAT UTILIZING A PLENUM VOLUME AND FLEXIBLE HOSES

(71) Applicant: Ford Global Technologies, LLC, Dearborn, MI (US)

(72) Inventors: Joseph Prescott Hickey, Lawrenceville, GA (US); Joseph August Himmel, IV, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 14/174,105

(22) Filed: Feb. 6, 2014

(65) Prior Publication Data

US 2015/0217665 A1    Aug. 6, 2015

(51) Int. Cl.
*A47C 7/74* (2006.01)
*B60N 2/56* (2006.01)

(52) U.S. Cl.
CPC .............. *B60N 2/5628* (2013.01); *B60N 2/565* (2013.01); *B60N 2/5621* (2013.01); *B60N 2/5657* (2013.01)

(58) Field of Classification Search
CPC ... B60N 2/5442; B60N 2/5635; B60N 2/5657
USPC ....................................... 297/180.13, 180.14
See application file for complete search history.

(56) References Cited

U.S. PATENT DOCUMENTS

| | | | |
|---|---|---|---|
| 3,506,308 A | | 4/1970 | Fenton |
| 5,524,439 A * | | 6/1996 | Gallup et al. ................. 62/3.5 |
| 6,105,667 A * | | 8/2000 | Yoshinori et al. ............ 165/202 |
| 6,179,706 B1 * | | 1/2001 | Yoshinori et al. ............ 454/120 |
| 6,546,578 B1 | | 4/2003 | Steinmeier |
| 6,786,541 B2 | | 9/2004 | Haupt et al. |
| 6,857,697 B2 * | | 2/2005 | Brennan et al. .......... 297/180.13 |
| 7,287,812 B2 | | 10/2007 | Ishima et al. |
| 7,452,028 B2 | | 11/2008 | Knoll et al. |
| 7,475,464 B2 | | 1/2009 | Lofy et al. |
| 7,827,805 B2 | | 11/2010 | Comiskey et al. |
| 7,828,050 B2 * | | 11/2010 | Esaki ............................ 165/202 |
| 7,837,270 B2 | | 11/2010 | Eriksson et al. |
| 7,877,827 B2 * | | 2/2011 | Marquette et al. ................ 5/423 |
| 8,393,162 B2 * | | 3/2013 | Chung ........................... 62/3.61 |
| 8,893,329 B2 * | | 11/2014 | Petrovski et al. .................. 5/423 |
| 2002/0096915 A1 * | | 7/2002 | Haupt et al. ............. 297/180.13 |
| 2008/0296939 A1 | | 12/2008 | Bajic et al. |

FOREIGN PATENT DOCUMENTS

| | | |
|---|---|---|
| DE | 102006061226 A1 | 6/2008 |
| DE | 102012006074 A1 | 11/2012 |
| JP | 2011251573 A | 12/2011 |
| KR | 1020080066428 A | 7/2008 |
| KR | 1020110051692 A | 5/2011 |
| KR | 101180702 B1 | 9/2012 |

* cited by examiner

*Primary Examiner* — David E Allred
*Assistant Examiner* — Alexander Harrison
(74) *Attorney, Agent, or Firm* — Vichit Chea; Price Heneveld LLP (57) ABSTRACT

A vehicle seating assembly includes a vehicle seat having a body. The body includes a center portion and four corner portions. A breathable coverstock covers a seating surface of the body. A plenum chamber is disposed below the body and is configured to receive and store a fluid. A cupped nozzle is disposed at each of the center portion and four corner portions. Each cupped nozzle includes a tapered base and a wide mouth proximate the coverstock. Fluid passageways extend through the body and connect the plenum chamber with the tapered base of each of the cupped nozzles. Pressurized fluid from the plenum chamber flows through the passageways to the cupped nozzles to deliver targeted airflow to a seated passenger.

16 Claims, 8 Drawing Sheets

VEHICLE SEATING ASSEMBLY HAVING A CLIMATE CONTROLLED SEAT UTILIZING A PLENUM VOLUME AND FLEXIBLE HOSES

FIELD OF THE INVENTION

The present invention generally relates to a vehicle seating assembly, and more particularly to a vehicle seating assembly having a climate controlled seat utilizing a plenum volume and flexible hoses.

BACKGROUND OF THE INVENTION

Vehicle seat comfort has become increasingly important as passengers take longer trips. Providing air circulation in the seat can increase the comfort of passengers. In addition, as modern vehicle seating improves ergonomic support and temperature controls, air circulation and ventilation between the seated occupants and the seating assemblies is progressively developing to be more important.

SUMMARY OF THE INVENTION

According to one aspect of the present invention, a vehicle seating assembly includes a vehicle seat having a body. The body includes a center portion and four corner portions. A breathable coverstock covers a seating surface of the body. A plenum chamber is disposed below the body and is configured to receive and store a fluid. A cupped nozzle is disposed at each of the center portion and four corner portions. Each cupped nozzle includes a tapered base and a wide mouth proximate the coverstock. Fluid passageways extend through the body and connect the plenum chamber with the tapered base of each of the cupped nozzles. Pressurized fluid from the plenum chamber flows through the passageways to the cupped nozzles to deliver targeted airflow to a seated passenger.

According to another aspect of the present invention, a vehicle seating assembly includes a vehicle seat having a body covered by a coverstock. A plenum chamber is disposed proximate a body and is configured to receive and store a gas. A plurality of cupped nozzles include a tapered base and a wide mouth proximate the coverstock. A hose extends through the body and connects the plenum chamber with the tapered base of each of the plurality of cupped nozzles.

According to yet another aspect of the present invention, a vehicle seating assembly includes a vehicle seat at least partially covered by a coverstock. A plenum chamber is disposed below the body and is operably coupled with a pressurized air source. A plurality of cupped nozzles are defined by generally hemispherically-shaped portions including a tapered base and a wide mouth proximate the coverstock. Passageways connect the plenum chamber with the tapered base of each of the plurality of cupped nozzles.

According to still another aspect of the present invention, a vehicle seating assembly includes a vehicle seat with a plenum chamber disposed therein. The plenum chamber defines a pressurized air source in fluid communication with a contact surface of the vehicle seat. A plurality of nozzles are generally disposed about portions of the vehicle seat and provide gradual flow of fluid from the plenum chamber to the contact surface of the vehicle seat. The vehicle seat air delivery system generally disclosed herein provides a manner in which to cool a vehicle passenger, and particularly maintain airflow across areas of a body that are in contact with the vehicle seat to minimize perspiration and increase the comfort of the passenger during travel.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
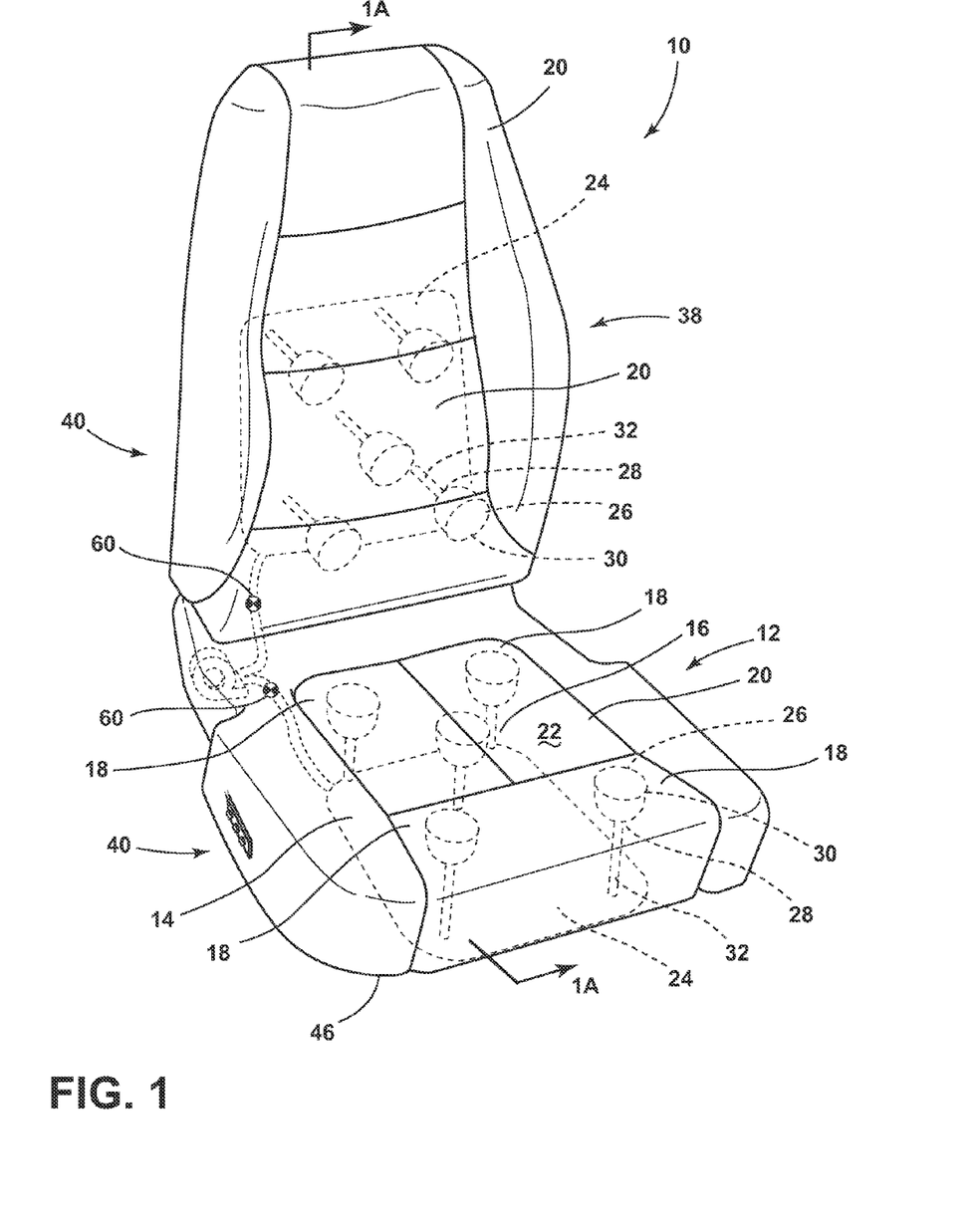
FIG. 1 is a top perspective view of one embodiment of a vehicle seating assembly incorporating one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
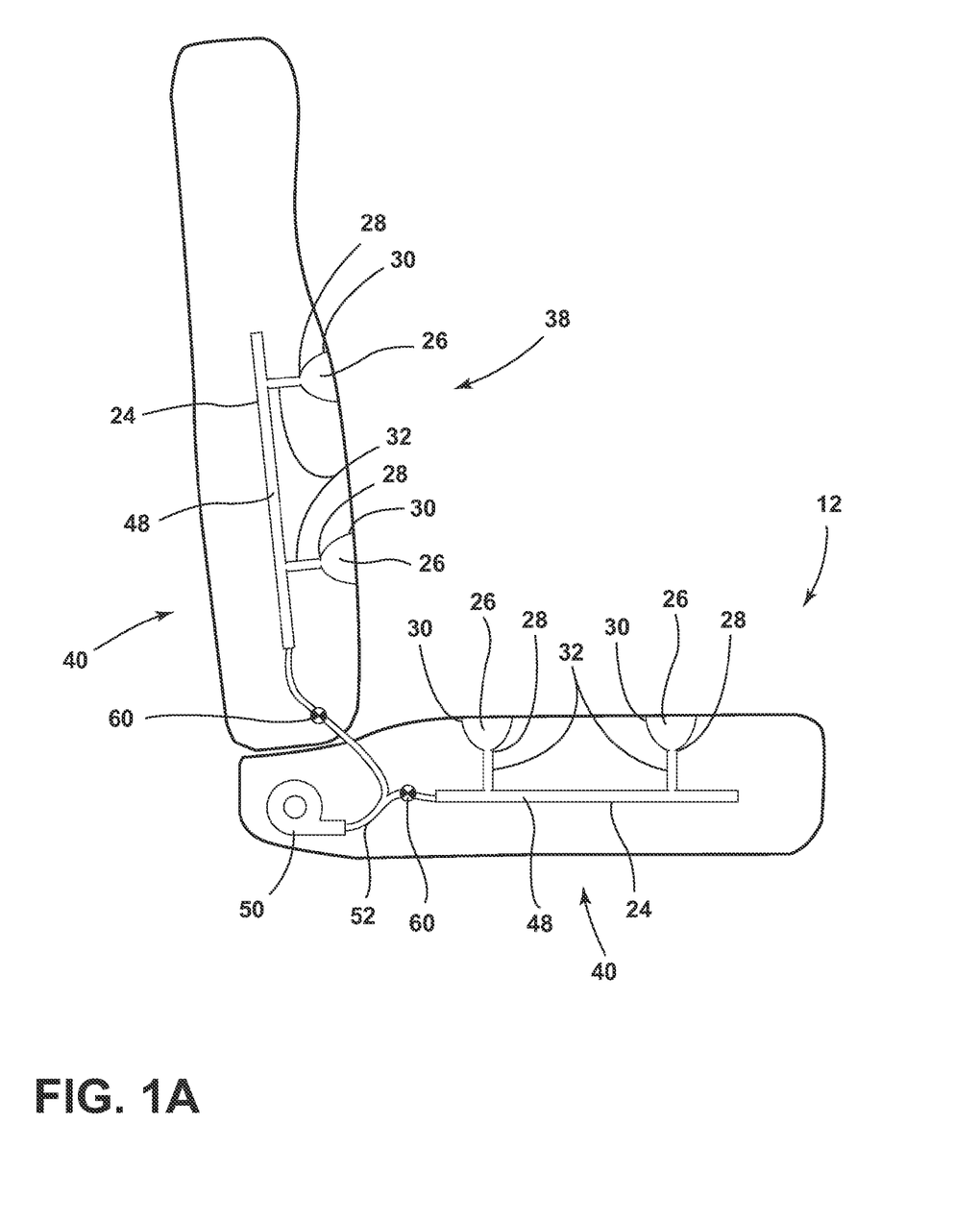
FIG. 1A is a side cross-sectional view taken at line IA-IA of FIG. 1.
Figure 2:
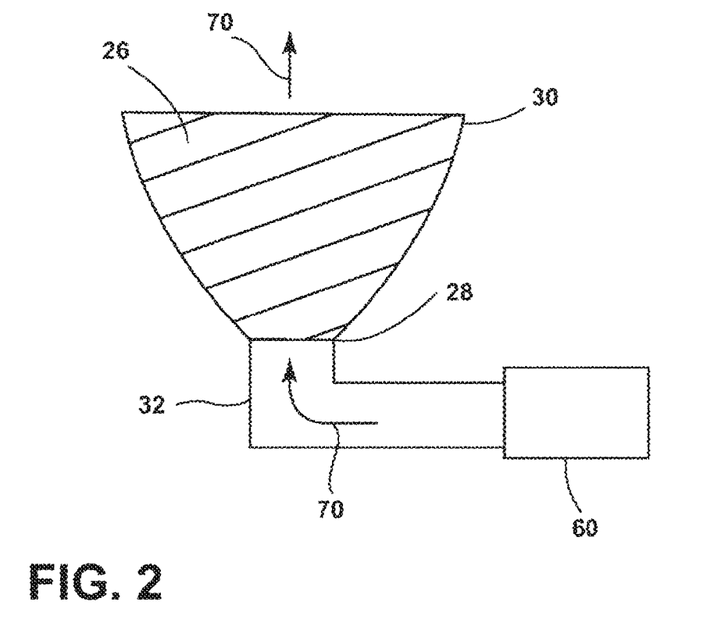
FIG. 2 is an enlarged elevational view of a cupped nozzle generally configured for use with a plenum chamber of the present invention.

Referring to the embodiments shown in FIGS. 1, 1A, and 2, reference numeral 10 generally designates a vehicle seating assembly having a vehicle seat 12 with a body 14. The body 14 includes a center portion 16 and four corner portions 18. A breathable coverstock 20 covers a seating surface 22 of the body 14. A plenum chamber 24 is disposed below the body 14 and is configured to receive and store a fluid. A cupped nozzle 26, which may be rifled, is disposed at each of the center portion 16 and four corner portions 18. Each cupped nozzle 26 includes a tapered base 28 and a wide mouth 30 proximate the coverstock 20. Fluid passageways 32 extend through the body 14 and connect the plenum chamber 24 with the tapered base 28 of each of the cupped nozzles 26. Pressurized fluid from the plenum chamber 24 flows through the fluid passageways 32 to the cupped nozzles 26 to deliver targeted airflow to a seated passenger.

Referring again to FIGS. 1, 1A, and 2, the vehicle seating assembly 10 includes a vehicle seatback 38 in addition to the vehicle seat 12, both of which are configured for use with a vehicle seat air delivery system 40. The body 14 may include a cushion or foam block construction. The body 14 may include channels defining the fluid passageways 32 or the fluid passageways 32 may be separate tube-like members.

The fluid passageways 32 are flexibly resilient and configured to move or adjust in the vehicle seat 12 or the vehicle seatback 38 under the weight of a passenger. The vehicle seatback 38 may include all or some of the same functionality as disclosed herein in relation to the vehicle seat 12. The vehicle seatback 38 is generally configured to rotate relative to the vehicle seat 12 over a wide range of motions to provide comfort to a seated passenger. Unfortunately, when temperature and atmospheric conditions are not ideal, the vehicle seat 12 and seatback may be uncomfortably cold or warm, such that the vehicle seating assembly 10 is not provided for comfortable transit in a vehicle. Accordingly, providing the vehicle seat air delivery system 40, as generally set forth in FIGS. 1, 1A, and 2, readily changes the temperature at an interface between the passenger and the vehicle seating assembly 10, and in particular, between the passenger and the vehicle seat 12 and the vehicle seatback 38, thus providing for a more pleasant traveling experience for the passenger.

With reference again to FIGS. 1 and 1A, the plenum chamber 24 is generally positioned proximate a bottom surface 46 of the vehicle seat 12 and the vehicle seatback 38, or proximate an intermediate portion of the vehicle seat 12 and the vehicle seatback 38. It is contemplated that the plenum chamber 24 may be connected via a variety of different connecting arrangements, including, but not limited to, adhesive, mechanical fasteners, heat staking, etc. Regardless of the manner of attachment, an inner volume 48 of the plenum chamber 24 may be configured to expand and retract upon activation of an air mover 50. The air mover 50 is configured to blow air into the plenum chamber 24, or alternatively, draw air from the plenum chamber 24. In the event that air is blown from the air mover 50 to the plenum chamber 24, air moves through a delivery hose 52 to the plenum chamber 24. Consequently, the plenum chamber 24 becomes pressurized. As noted above, the plenum chamber 24 may expand upon pressurization, or alternatively, may be sufficiently inflexible, such that the inner volume 48 of the plenum chamber 24 does not expand during pressurization and instead remains substantially constant.

Referring once again to FIGS. 1, 1A, and 2, as the plenum chamber 24 becomes pressurized, the fluid passageways 32 receive air from the plenum chamber 24 and direct the pressurized air or fluid to the cupped nozzles 26. The cupped nozzles 26 distribute air across the seating surface 22. The tapered base 28 of each cupped nozzle 26 is operably coupled to one fluid passageway 32 while the wide mouth 30 is disposed proximate the seating surface 22 and is between 2.54 cm and 10.16 cm in diameter and disposed directly under the coverstock 20, but below the coverstock 20. Air that is blown from the air mover 50 flows into the plenum chamber 24. From the plenum chamber 24, the air moves quickly through the pressurized fluid passageways 32, but slows down upon reaching the cupped nozzles 26, as the wide mouth 30 of the cupped nozzles 26 has a larger diameter than the fluid passageways 32. The air then passes through the coverstock 20, which may be a fabric material, perforated leather, etc. As the air blows through the coverstock 20, the posterior of a passenger may be cooled (in the event that the applied air is cooled), or warmed (in the event that the air provided by the air mover 50 is heated prior to being expelled to the seating surface 22 of the coverstock 20). As a result of this configuration, a spacer material located between the coverstock 20 and the body 14 is not necessary. In the illustrated embodiment, five such cupped nozzles 26 are provided at delivery areas generally designated proximate the buttocks, groin, and legs of the passenger. However, it is also contemplated that various other combinations may be utilized. It is also contemplated that the back of the passenger may be cooled or warmed in a similar fashion.

It is also contemplated that the cupped nozzles 26 may take on other configurations and may be conical or may include a flared end. In either instance, the wide mouth 30 of the cupped nozzle 26 is larger than the diameter of the fluid passageway 32, which delivers air to the cupped nozzle 26. It is generally contemplated that the plenum chamber 24 may be disposed below the vehicle seat 12, as set forth above, or alternatively, may be disposed inside the vehicle seat 12, such that the plenum chamber 24 is not visible to a passenger. In addition, it is also contemplated that the delivery hose 52 that runs to the plenum chamber 24 on the vehicle seat 12 may be linked with the delivery hose 52 coupled with the vehicle seatback 38, such that the vehicle seatback 38 and the vehicle seat 12 are synced and deliver generally proportionate volumes of air to the plenum chamber 24 in the vehicle seat 12 and the vehicle seatback 38 and consequently to a seated passenger. Alternatively, the fluid passageways 32 may include a valve 60 that can direct more or less air to the vehicle seat 12 relative to the vehicle seatback 38. Accordingly, if the passenger wishes to obtain more air movement on the vehicle seat 12, this preference can be accommodated. Alternatively, it is also contemplated that multiple air movers 50 can be utilized such that the air movement at the vehicle seatback 38 may be completely independent from air movement at the vehicle seat 12. Still further, it is contemplated that airflow valves 60 may be disposed at each of the fluid passageways 32, thereby allowing for custom settings of air movement on both the vehicle seatback 38 and the vehicle seat 12. It is also contemplated that in the event separate air movers 50 are provided for the vehicle seatback 38 and the vehicle seat 12, different temperature settings can be provided to the air that is delivered through the cupped nozzles 26. For example, cool air could be applied to the vehicle seatback 38, while warm air may be applied to the vehicle seat 12.

With reference again to FIG. 2, the fluid passageways 32 may extend orthogonal relative to the plenum chamber 24, or may extend at an angle relative to the plenum chamber 24, such that an elbow piece is utilized. In this instance, the general profile of the plenum chamber 24, the fluid passageways 32, and the cupped nozzles 26 is minimized, thereby providing a lower profile vehicle seat 12 or vehicle seatback 38. As previously noted, the vehicle seat air delivery system 40 may forcibly or gently blow air in the direction of an arrow 70, which will ultimately pass through the coverstock 20 and on to a seated passenger. However, the vehicle seat air delivery system 40 could also be used to draw air from the seating surface 22 in a direction opposite arrows 70.

Figure 3:
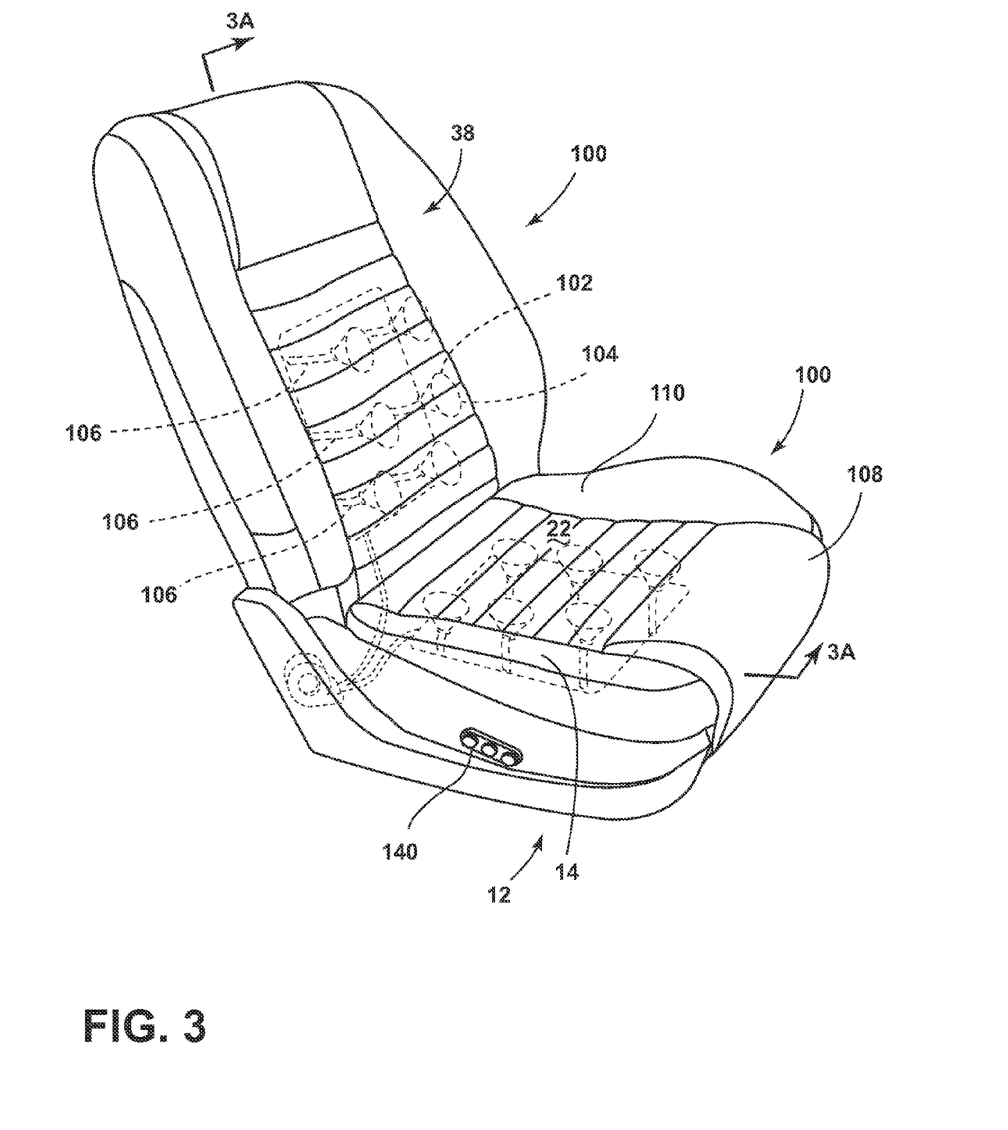
FIG. 3 is a top perspective view of one embodiment of a vehicle seat air delivery system of the present invention.
Figure 3A:
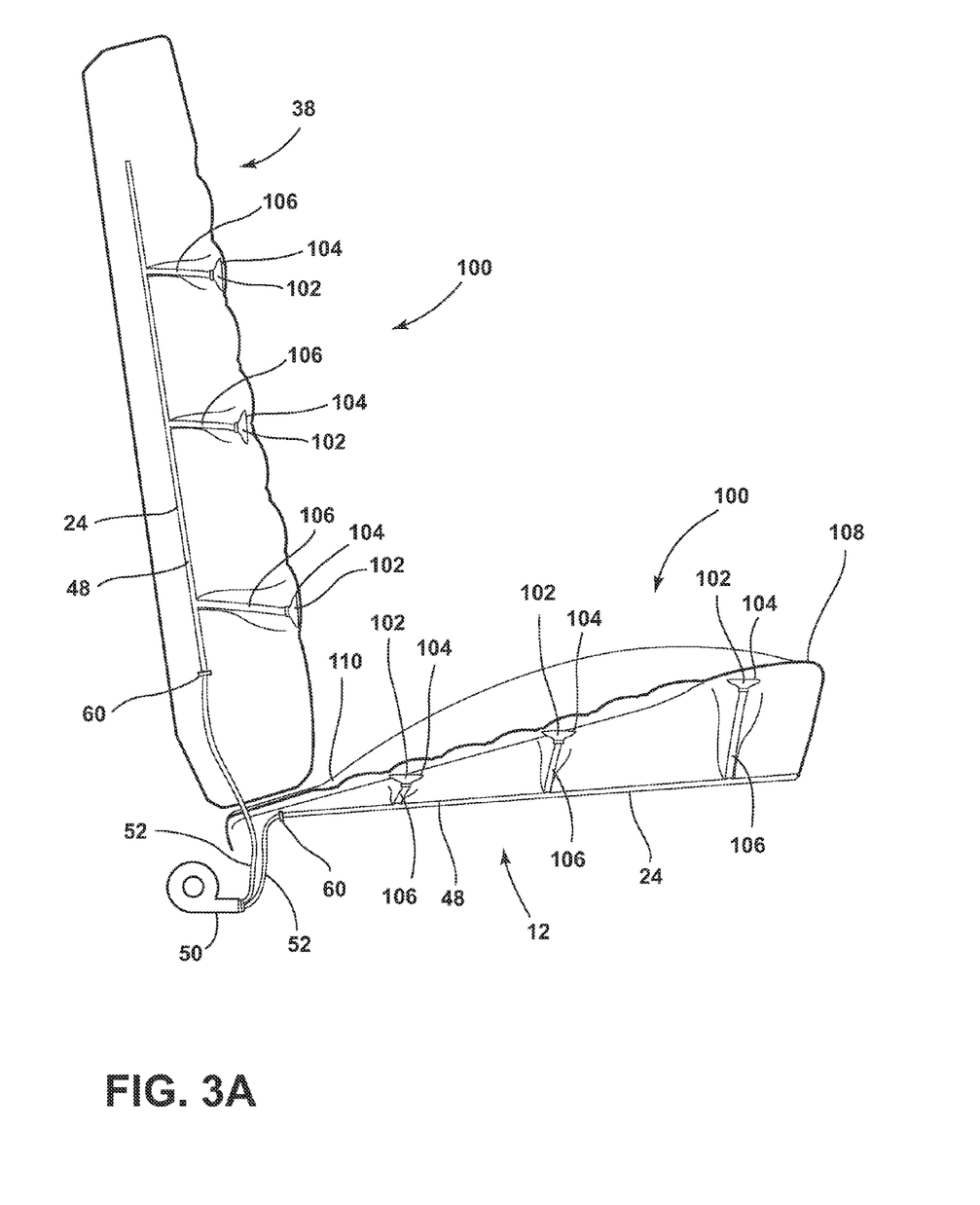
FIG. 3A is a side cross-sectional view taken at line IIIA-IIIA of FIG. 3.
Figure 4:
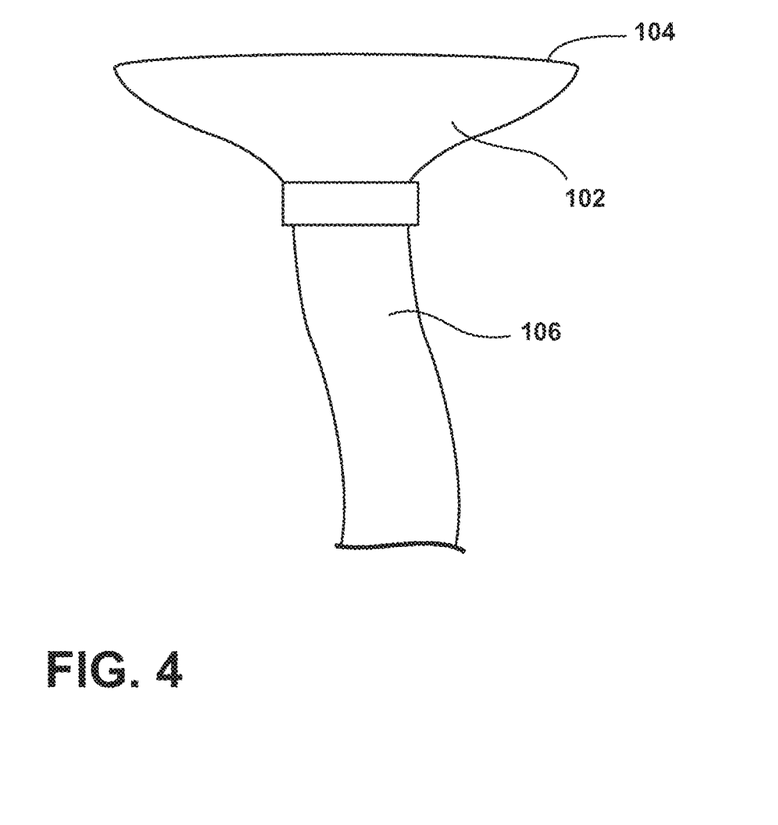
FIG. 4 is an enlarged elevational view of another embodiment of a nozzle configured for use with the embodiment generally illustrated in FIGS. 3 and 3A.

Referring now to FIGS. 3, 3A, and 4, another embodiment of the present invention is illustrated. It will be understood that many of the features described herein in relation to other embodiments can also be utilized here. Many of these features include similar reference numerals. A vehicle seat air delivery system 100 is illustrated that can deliver air to both the vehicle seat 12 and the vehicle seatback 38. A nozzle 102 includes a low profile end 104, which slows down the flow of air at a faster rate than a narrower nozzle. Additionally, fluid passageways 106 are provided and include different lengths, depending on where the nozzles 102 are positioned on the vehicle seat 12 and the vehicle seatback 38. For example, the fluid passageway 106 that is closer to a forward portion 108 of the vehicle seat 12 includes a long passageway. However, the fluid passageway 106 proximate a rear portion 110 of the vehicle seat 12 is relatively short in comparison. This same general configuration is also present in the vehicle seatback 38. Each of the fluid passageways 106 of the vehicle seat 12 connect with the plenum chamber 24 of the vehicle seat 12, which is connected with the delivery hose 52 operably coupled with the air mover 50. As with the previous embodiment, the air mover 50 may pressurize or depressurize the plenum chambers 24 in the vehicle seat 12 and the vehicle seatback 38. In the event the plenum chambers 24 are depressurized, the plenum chambers 24 will likely have and maintain a relatively fixed inner volume 48 that does not collapse during depressurization. In the event the plenum chambers 24 are pressurized, it is contemplated that the plenum chambers 24 may expand and retract, or alternatively, may maintain a fixed inner volume 48.

Figure 5:
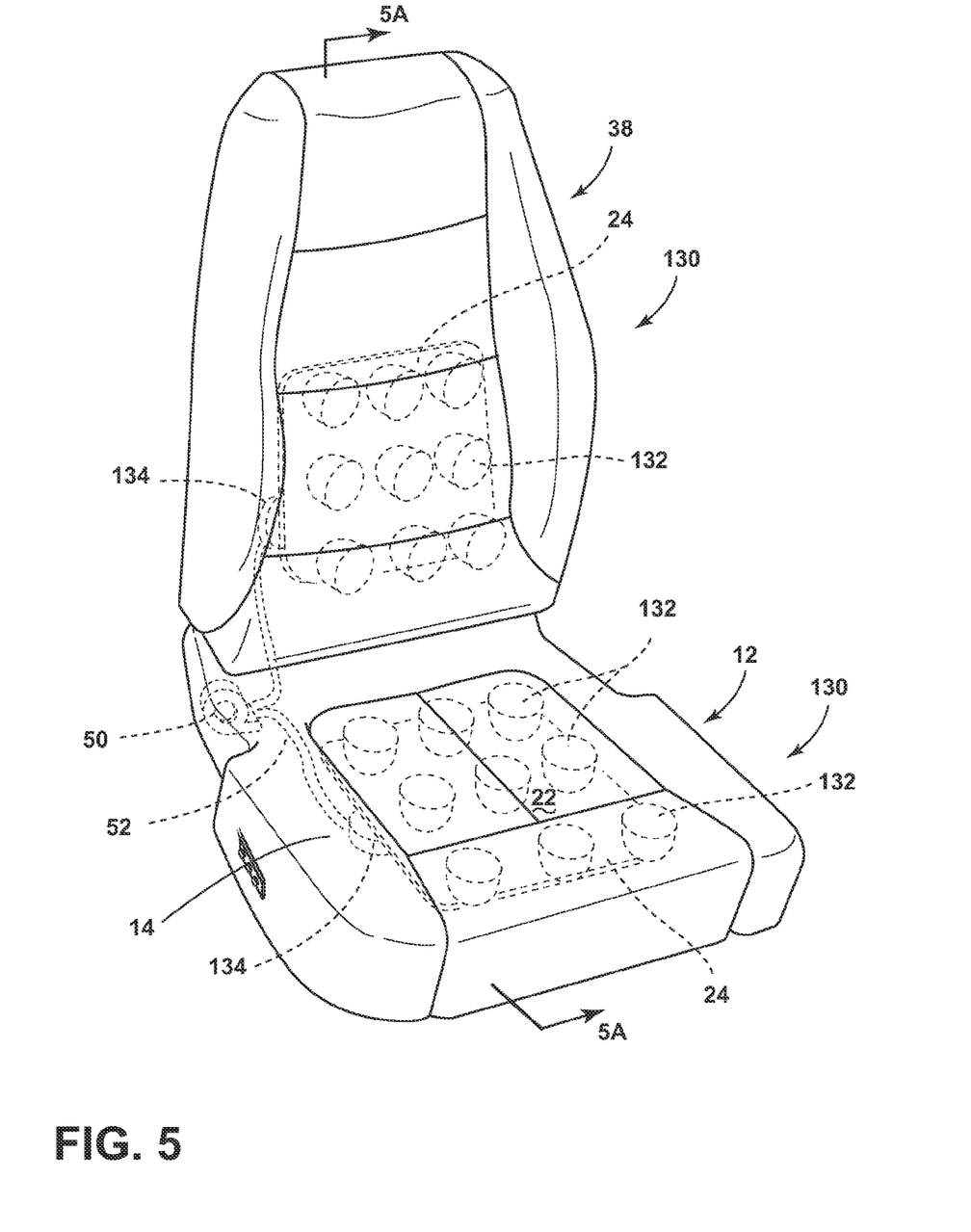
FIG. 5 is a top perspective view of another embodiment of a vehicle seat air delivery system of the present invention.
Figure 5A:
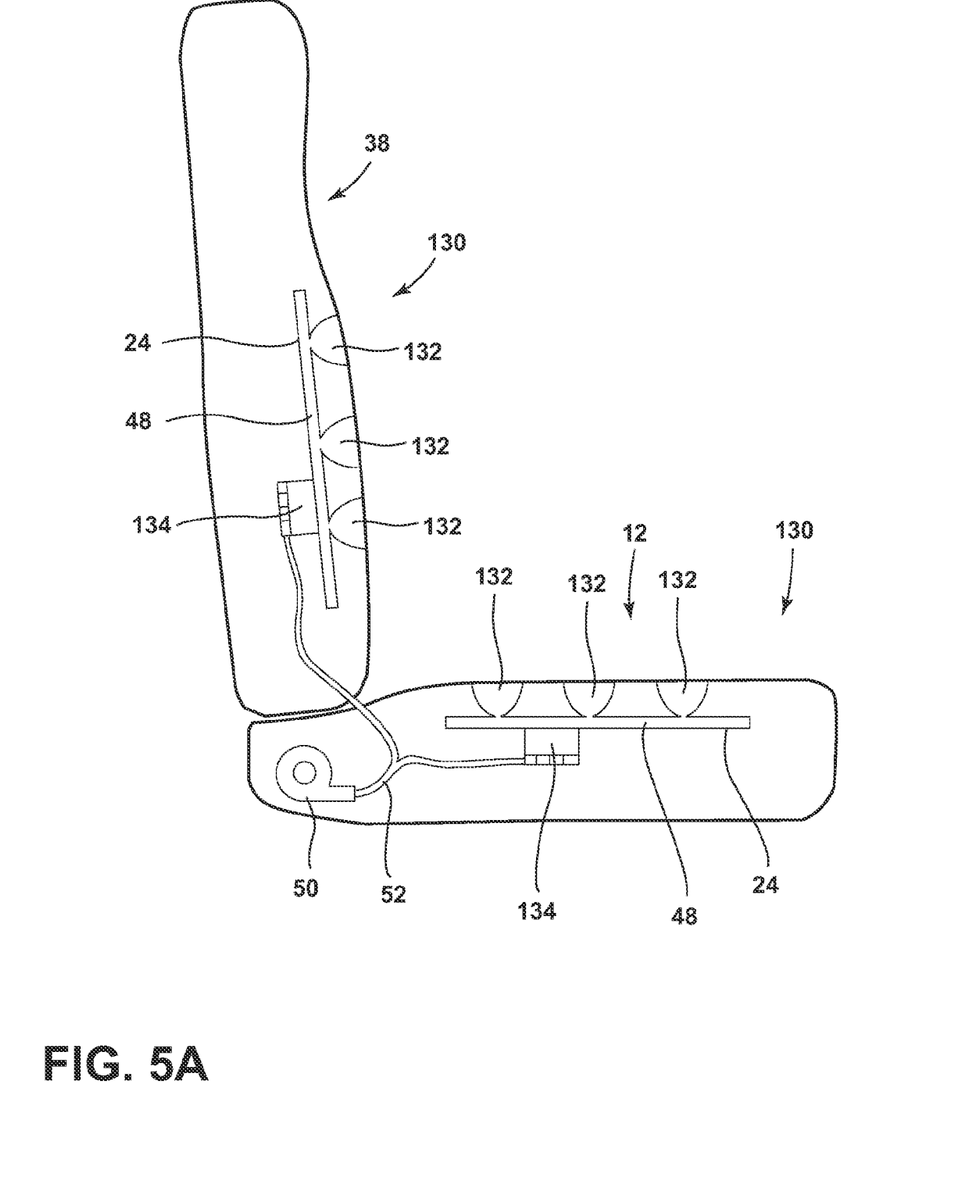
FIG. 5A is a side cross-sectional view taken at line VA-VA of FIG. 5.

With reference now to FIGS. 5 and 5A, yet another embodiment of the present invention is illustrated. A vehicle seat air delivery system 130 is configured for use with the vehicle seat 12 and the vehicle seatback 38. The plenum chambers 24 in both the vehicle seat 12 and the vehicle seatback 38 include a relatively low profile and are directly connected with nozzles 132 configured to deliver or draw air from the seating surface 22 of the vehicle seat 12 and the vehicle seatback 38. In this configuration, it is contemplated that the nozzles 132 may have a relatively low profile or a wider profile. When the nozzles 132 include a relatively low profile, the plenum chambers 24 of the vehicle seat 12 and the vehicle seatback 38 will be proximate the seating surface 22 adjacent the coverstock 20 of the vehicle seat 12 and the vehicle seatback 38. The vehicle seat air delivery system 130 also includes a secondary device 134 proximate the plenum chambers 24 located in both the vehicle seat 12 and the vehicle seatback 38. The secondary device 134 may be any of a variety of devices, including, but not limited to, a fan, a heating element, a cooling element, a scent or aromatic fragrance dispenser, etc. It is contemplated that the secondary device may also include more than one functionality to provide yet an even more pleasant traveling experience to a passenger. Many of the same features that are disclosed above with regard to the earlier embodiments also apply to the embodiments set forth in FIGS. 5 and 5A.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
a vehicle seat including a body having a center portion and four corner portions;
a breathable coverstock covering a seating surface of the body;
a plenum chamber disposed below the body and disposed under an area of the seating surface and having an area in a horizontal plane generally equal to the area of the surface, the plenum chamber being configured to receive and store a fluid;
a cupped nozzle disposed at each of the center portion and four corner portions, each cupped nozzle including a tapered base and a wide mouth proximate the coverstock; and
a plurality of fluid passageways extending through the body and directly connecting the plenum chamber with the tapered base of a respective one of each of the cupped nozzles, wherein pressurized fluid from the plenum chamber flows through the fluid passageways to the cupped nozzles to deliver targeted airflow to a seated passenger, and further wherein a length of the fluid passageways proximate a forward portion of the seat are longer than a length of the fluid passageways proximate a rear portion of the seat.

2. The vehicle seating assembly of claim 1, wherein the body includes a flexible foam block.

3. The vehicle seating assembly of claim 1, wherein the plurality of passageways are defined by channels formed in the body of the vehicle seat.

4. The vehicle seating assembly of claim 1, wherein the vehicle seat is free of any spacer fabric configured to distribute air across the seating surface.

5. The vehicle seating assembly of claim 1, wherein the coverstock includes a leather material with a plurality of perforations.

6. A vehicle seating assembly comprising:
   a vehicle seat including a seating surface area;
   a plenum chamber disposed under the seating surface area and having an area in a horizontal plane generally equal to the seating surface area, the plenum chamber being configured to receive and store a fluid;
   a plurality of cupped nozzles including a tapered base and a wide mouth proximate a coverstock, the tapered base being directly coupled with the plenum chamber; and
   a heating element disposed below the plenum chamber and configured to warm air of the plenum chamber.

7. The vehicle seating assembly of claim 6, wherein the body includes a flexible foam block.

8. The vehicle seating assembly of claim 6, wherein the vehicle seat is free of any spacer fabric configured to distribute air across a seating surface.

9. The vehicle seating assembly of claim 6, wherein the wide mouth of the plurality of cupped nozzles is between 2.54 cm and 10.16 cm in diameter and is disposed directly under the coverstock.

10. A vehicle seating assembly comprising:
    a seat defining a seating surface;
    a single plenum chamber disposed below the seating surface and having an area in a horizontal plane generally equal to the area of the surface and operably coupled with a pressurized air source; and
    a heating element proximate the plenum chamber; and
    passageways directly connecting the plenum chamber with a tapered base of a respective one of each of the plurality of cupped nozzles.

11. The vehicle seating assembly of claim 10, wherein the air source is operably coupled to an air delivery system of a vehicle.

12. The vehicle seating assembly of claim 10, wherein the seating assembly includes a flexible foam block.

13. The vehicle seating assembly of claim 10, further comprising:
    a vehicle seatback including a plurality of cupped nozzles defined by generally hemispherically-shaped portions including a tapered base and a wide mouth proximate a coverstock.

14. The vehicle seating assembly of claim 10, wherein the passageways are defined by channels formed in the body of the vehicle seat.

15. The vehicle seating assembly of claim 14, wherein the channels include delivery hoses that extend from the plenum chamber to the tapered base of each of the plurality of cupped nozzles.

16. The vehicle seating assembly of claim 10, wherein the vehicle seat is free of any spacer fabric configured to distribute air across a seating surface.

\* \* \* \* \*